US007094860B2

(12) United States Patent
Inaba et al.

(10) Patent No.: US 7,094,860 B2
(45) Date of Patent: Aug. 22, 2006

(54) MALEIMIDE GROUP-CONTAINING POLYMER PARTICLES AND METHOD OF PRODUCING THE SAME

(75) Inventors: Yoshihiro Inaba, Minamiashigara (JP); Chisato Urano, Minamiashigara (JP); Takako Kobayashi, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/780,742

(22) Filed: Feb. 19, 2004

(65) Prior Publication Data

US 2005/0014924 A1 Jan. 20, 2005

(30) Foreign Application Priority Data

Jul. 14, 2003 (JP) ............................ 2003-196340

(51) Int. Cl.
*C08G 63/00* (2006.01)

(52) U.S. Cl. ...................... 528/191; 528/170; 528/310; 546/187; 546/278.7; 548/547; 548/548

(58) Field of Classification Search ................ 528/170, 528/191; 546/187, 278.7; 548/547, 548
See application file for complete search history.

(56) References Cited

U.S. PATENT DOCUMENTS 6,410,611 B1 * 6/2002 Sakurai et al. .............. 522/103

FOREIGN PATENT DOCUMENTS

JP A 11-106391 4/1999

OTHER PUBLICATIONS

Lanciotti et al. Targeting Adenoviral Vectors Using Heterofunctional Polyethylene Glycol FGF2 Conjugates,; Mol Ther. Jul. 2003; 8(1):99-107.*

Kyo et al. "Evaluation of MafG interaction with Maf recognition element arrays by surface plasmon resonance imaging technique"; Genes to Cells, (2004) 9, 153-164. (note:Received: Oct. 17, 2003 Accepted: Nov. 26, 2003).*

The 2001/2002 Fluka Company product catalogue; pp. 909.

* cited by examiner

*Primary Examiner*—Terressa Boykin
(74) *Attorney, Agent, or Firm*—Oliff & Berridge, PLC

(57) ABSTRACT

The present invention relates to a maleimide group-containing polymer particle containing a crosslinked polymer particle containing a group represented by the following formula (1) and to a method of producing the maleimide group-containing crosslinked polymer particle by reacting hydroxymethylmaleimide with a hydroxyl group-containing polymer particle obtained by introducing a polyethylene glycol into a crosslinked polymer particle:

Formula (1)

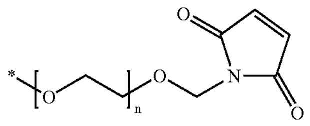

wherein n denotes an integer of 1 or more.

16 Claims, No Drawings

MALEIMIDE GROUP-CONTAINING POLYMER PARTICLES AND METHOD OF PRODUCING THE SAME

CROSS-REFERENCE TO RELATED APPLICATION

This application claims priority under 35 U.S.C. 119 from Japanese Patent Application No. 2003-196340, the disclosure of which is incorporated by reference herein.

BACKGROUND OF THE INVENTION

1. Field of the Invention

The present invention relates to fine organic polymer particles and a method of producing the same, and particularly, to a method of producing maleimide group-containing polymer particles that can be applied to uses such as carriers for diagnostic medecines or medicaments, chromatographic carriers, viscosity regulators, resin molding materials, paint additives, crosslinking/hardening agents and cosmetic additives.

2. Description of the Related Art

Functional polymer particles such as deionized resins and chelating resins have been widely used as carriers for various chemical substances. Such functional polymer particles have various reactive groups on the surface of insoluble polymers. Functional polymers into which various active hydrogen-containing groups are introduced, such as a carboxyl group, hydroxyl group and a primary or secondary amino group, have been used in various applications.

In recent years, biological molecules such as nucleic acids, peptides and antibodies or synthetic molecules analogous to these biological molecules have been used in affinity chromatography, diagnostic medecines, inspection chemicals or the like by fixing these biological molecules to polymer particles while retaining the activity of these biological molecules. When polymer particles having high selectivity are used in this manner, it has been preferable to use those having a maleimide group that can form a selective and stable bond with an SH group contained in biological molecules or analogous synthetic molecules, and can reliably carry these molecules. In these applications, it is necessary for the polymer carrier to carry the desired amount of a substance uniformly and reliably, and also to be highly dispersible in aqueous solvents.

There are a few known examples of polymer particles having a maleimide group. For example, fine particles in which a phospholipid layer containing a maleimide group exists on the particle surfaces has been disclosed (see, for example, Japanese Patent Application Laid-Open (JP-A) No. 11-106391).

Nonetheless, in this method, a maleimide group-containing phospholipid must be produced in advance by reacting a maleimide group-containing compound such as N-(6-maleimidecaproyloxy)succinimide with a phospholipid and purifying the resultant product by a method such as column chromatography. Moreover, because a phospholipid layer containing a maleimide group is produced through multistage treatment and then formed on nuclear particles such as magnetic particles, this method has drawbacks in that the process is very complicated and the resulting particles are physically weak. This is due to the fact that the nuclear particles are not chemically bonded with the maleimide group-containing phospholipid layer.

There is also an example in which polystyrene particles containing a maleimide group have been reported (see, for example, the 2001/2002 Fluka Company product catalogue, p. 909). However, the maleimide group is a strongly hydrophobic functional group having very poor dispersibility in aqueous media. Further, the amount of the maleimide group is 0.4 mmol/g or less, which is insufficient for a functional group used to attain the aforementioned objects.

There is a need for maleimide group-containing polymer particles which require neither special raw materials nor a monomer having a reactive functional group, thus being cheaper and safe. It is imperative that such particles require no complicated operation, have increased loading amount of the maleimide group making it easy to control the loading, be mechanically strong and have superior water-dispersibility. A method for producing such particles is also required.

SUMMARY OF THE INVENTION

The present invention provides a maleimide group-containing crosslinked polymer particle, the crosslinked polymer particle comprising a group represented by the following formula (1).

Formula (1)

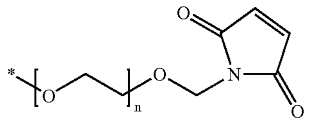

In formula (1), n denotes an integer of 1 or more.

Also, the invention provides a method of producing a maleimide group-containing crosslinked polymer particle, the method comprising reacting hydroxymethylmaleimide with a hydroxyl group-containing polymer particle obtained by introducing (poly)ethylene glycol.

DETAILED DESCRIPTION OF THE INVENTION

The maleimide group-containing polymer particle of the present invention comprises a crosslinked polymer particle having a group represented by the following formula (1).

Also, the method of producing a maleimide group-containing polymer particle according to the invention comprises reacting hydroxymethylmaleimide with a hydroxyl group-containing polymer particle into which (poly)ethylene glycol has been introduced.

Here, the "(meth)acrylate" means an "acrylate" and a "methacrylate". Also, the (poly)ethylene glycol means ethylene glycol and a polyethylene glycol.

The invention will be explained in detail.

<Maleimide Group-containing Polymer Particle>

The maleimide group-containing polymer particle is a particle that contains the crosslinked polymer particle group represented by the following formula (1).

Formula (1)

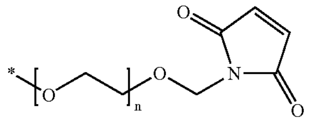

In formula (1), the maleimide group is chemically bound with the crosslinked polymer particle through an ethylene oxide chain, wherein n of the ethylene oxide chain denotes an integer of 1 or more. The ethylene oxide chain can be obtained by reacting (poly)ethylene glycol with the crosslinked polymer to combine the both chemically.

The maleimide group-containing polymer particle of the invention may contain the group having a maleimide group represented by formula (1) on the surface of the crosslinked polymer particle, in the inside of the crosslinked polymer particle or both on the surface and in the inside of the crosslinked polymer particle. Further, n may be any of integers of 1 or more.

Generally, n is preferably 2 or more and more preferably 4 or more from the viewpoint of obtaining high dispersibility in an aqueous solvent.

The maleimide group-containing polymer particle of the invention contains the maleimide group represented by formula (1) preferably in an amount of 0.4 mmol/g or more, and more preferably in an amount of 0.5 mmol/g or more and still more preferably 0.6 mmol/g or more from the viewpoint of increasing the quantity of reaction per unit mass as much as possible. It is possible to raise the reaction rate with an SH group-containing compound by setting the amount of maleimide group to 0.4 mmol/g or more.

The maleimide group-containing polymer particle of the invention possesses such a nature that it has high dispersibility in an aqueous solvent because a hydrophilic polyethylene glycol chain exists between the maleimide group and the particle.

As mentioned above, the maleimide group-containing polymer particle of the invention has high dispersibility in an aqueous solvent. The carrying ability of the maleimide group-containing polymer particle results from formation of a selective and stable bond between the maleimide group-containing polymer particle and an SH group contained in biological molecules or analogous synthetic molecules, and the particle may be utilized as a highly selective carrying particle.

No particular limitation is imposed on the maleimide group-containing polymer particle of the invention and any appropriate particle may be selected in accordance with the application. Nonetheless, from the viewpoint of facilitating solid-liquid separation, it is preferable that the maleimide group-containing polymer particle has an average particle diameter of 1 to 50 μm, and more preferably of 3 to 40 μm, and particularly preferably of 5 to 20 μm.

When the particle diameter falls in a range from 1 to 50 μm, it is possible to raise the solid-liquid separation characteristics by filtration or centrifugation while maintaining sufficient reaction quantity per unit mass.

<Crosslinked Polymer Particle>

The crosslinked polymer particle used in the invention has a (meth)acrylate polymer represented by the following formula (2) as its structural component.

Formula (2)

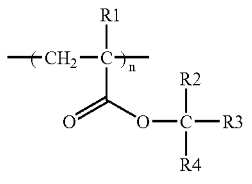

In formula (2), R1 represents a hydrogen atom or a methyl group, R2 to R4, which may be the same or different, respectively represent a substituted or unsubstituted alkyl group having 1 to 12 carbon atoms or a substituted or unsubstituted aryl group. n denotes an integer of 1 or more.

The alkyl group in the (meth) acrylate polymer represented by formula (2) is alkyl groups having 1 to 12 carbon atoms, which may be unsubstituted or may have a substituent. Examples of the alkyl group include methyl, ethyl, n-propyl, isopropyl, n-butyl, t-butyl, pentyl, isopentyl, neopentyl, hexyl, heptyl, n-octyl, nonyl, decyl, undecyl, dodecyl and benzyl. Among these groups, methyl, ethyl, propyl and benzyl are preferable and methyl is more preferable.

The aryl group is aryl groups having 1 to 12 carbon atoms, which may be unsubstituted or may have a substituent. Examples of the aryl group include phenyl naphthyl, tolyl and p-n-octyloxyphenyl and phenyl is preferable. n denotes an integer of 1 or more.

Examples of the above substituent include an alkyl group, an alkoxy group, a halogen atom, and an aryl group. The alkyl group is the same groups that are defined as the alkyl group representing the above R2 to R4. Examples of the alkoxy group include methoxy, ethoxy, propoxy and butoxy. Among these groups, methoxy and ethoxy are preferable.

Examples of the halogen atom include a fluorine atom, a chlorine atom, a bromine atom, and an iodine atom. Among these groups, a fluorine atom and a chlorine atom are preferable.

The aryl group is the same groups that are defined as the aryl group representing the above R2 to R4.

Specific examples of the (meth)acrylate polymer represented by formula (2) include polymers of monomers such as t-butyl(meth)acrylate, 1,1-dimethylpropyl(meth)acrylate, 1,1,2-trimethylpropyl(meth)acrylate, 1,1-diethylpropyl (meth)acrylate, 1,1-dimethylhexyl(meth)acrylate and 1-methyl-1-phenylethyl(meth)acrylate. Among these polymers, polymers of t-butyl(meth)acrylate are preferable in view of availability, cost and reactivity of the monomer.

The crosslinked polymer particle used in the invention is obtained specifically by copolymerizing the above monomer with a monomer having crosslinking ability such as divinylbenzene, ethylene glycol di(meth)acrylate, diethylene glycol di(meth)acrylate, glycidyl(meth)acrylate or 2-([1'-methylpropylideneamino]carboxyamino)ethyl(meth)acrylate. The crosslinked structure may be formed either during polymerization or after polymer particles are formed by polymerization.

Also, the crosslinked polymer particle may be obtained by copolymerizing any of other monomers besides the polymer components of the aforementioned monomer. The hydroxyl group of the particle can be controlled by copolymerizing a desired one of other monomers, a polymer made of which has little or no ester exchange capability, with the above monomer via changing of the copolymerization ratio. Therefore, control of the maleimide group in the maleimide group-containing polymer particle can be achieved. Examples of other monomers preferable for this purpose include styrene and methyl(meth)acrylate.

In the invention, known methods may be utilized for forming crosslinked polymer particles. Eexamples of preferably used methods include suspension polymerization, emulsion polymerization, dispersion polymerization, and seed polymerization. It is possible to conduct suspension polymerization by using an emulsification method known as layer emulsion.

For the above polymerization, a polymerization initiating catalyst well-known to a person skilled in the art may be used, if necessary. Specific examples of the catalyst include organic peroxides such as diacyl peroxide, ketone peroxide and alkyl hydroperoxide; inorganic peroxides such as hydrogen peroxide and ozone; oil-soluble azo type organic compounds such as azobisvaleronitrile (AIBN; available under the name of V-60 from Wako Pure Chemical Industries, Ltd.), 2,2'-azobis(2-methylbutyronitrile) (available under the name of V-59 from Wako Pure Chemical Industries, Ltd.) and 2,2'-azobis(2,4-dimethylvaleronitrile) (available under the name of V-65 from Wako Pure Chemical Industries, Ltd.); and water-soluble azo type organic compounds such as 2,2'-azobis(2-amidinopropane)diacid salts (available under the name of V-50 from Wako Pure Chemical Industries, Ltd.), 2,2'-azobis[2-methyl-N-(2-hydroxyethyl)propionamide] (available under the name of VA-086 from Wako Pure Chemical Industries, Ltd.) and 2,2'-azobis[2-(2-imidazoline-2-yl)propane]diacid salts (available under the name of VA-044 from Wako Pure Chemical Industries, Ltd.). When an initiator is used, it is used in an amount that suffices to initiate polymerization in a well-controlled manner. Such an amount is well-known to those skilled in the art. Generally, it is preferable that the initiator be used in an amount of 0.1 to 5.0% by mass.

Moreover, a known dye, a known pigment, carbon black and a magnetic powder may be added for the purpose of coloring the crosslinked polymer particle.

Also, a non-polymerizable additive such as toluene, octane, cyclohexanone, dibutyl phthalate and lauryl alcohol may be compounded together with the above monomer and removed after polymerization to make porous particles.

The crosslinked polymer particle used in the invention does not possess any particular reactive functional group, and is therefore advantageous in that it has little or no reaction with additives and solvents and, even when it remains in the particle, has little or no adverse effect on the particle properties.

<Hydroxyl Group-containing Polymer Particle>

The hydroxyl group-containing polymer particle used in the invention is a polymer particle obtained by introducing (poly)ethylene glycol into the aforementioned crosslinked polymer particle having a (meth)acrylate polymer represented by formula (2) as its structural component.

The aforementioned (poly)ethylene glycol implies ethylene glycol and a polyethylene glycol and means a diol compound represented by formula $HO(CH_2CH_2O)_nH$. n has the same meaning as the n number in the above formula (1).

Any method may be used for introducing (poly)ethylene glycol into the (meth)acrylate polymer represented by formula (2) and an appropriate method may be selected according to the object or purpose.

For example, the above crosslinked polymer particle may be hydrolyzed with an acid or an alkali to convert the ester part once into a carboxyl group and then an ester reaction of the carboxyl group with a hydroxyl group of a diol compound such as ethylene glycol or polyethylene glycol is caused in otrder to bind the diol compound with the polymer particle and form a hydroxyl group-containing polymer particle. Alternatively, a diol compound such as ethylene glycol or a polyethylene glycol is reacted directly with the above polymer particle in the presence of an appropriate ester exchange catalyst in order to conduct an ester exchange reaction and bind the diol compound with the polymer particle, thereby forming a hydroxyl group-containing polymer particle.

In the invention, the above hydroxyl group-containing polymer particle is preferably obtained by reacting a carboxyl group obtained by hydrolyzing the crosslinked polymer particle having the (meth)acrylate polymer with (poly) ethylene glycol. Further, the above hydroxyl group-containing polymer particle is preferably one obtained by a direct ester exchange reaction between the above crosslinked polymer particle having the (meth)acrylate polymer represented by formula (2) as its structural component and (poly) ethylene glycol in the presence of a metal-containing ester exchange reaction catalyst.

In order to smoothly advance the above ester exchange, it is preferable to react the above compound in an amount equal to or more than the total mol of functional groups contained in the polymer particle. However, the amount of the above compound may be equal to or less than the total mol because all functional groups contained in the polymer particle do not participate in the ester exchange reaction in actual practice.

It is preferable to use the hydroxyl group-containing polymer particle obtained in this manner for the raw material of the maleimide group-containing polymer particle of the invention.

In the invention, the ratio of the crosslinked polymer particle to (poly)ethylene glycol to be reacted depends on a combination between the type of the ester part of the crosslinked polymer particle and that of the (poly)ethylene glycol and the amount of these functional groups to be introduced. However, the above (poly)ethylene glycol is used fundamentally in an amount of about two times to 10 times the weight of the crosslinked polymer particle. The polyethylene glycol is reacted with the polymer particle at 120° C. to 200° C. for 5 to 24 hours in the above non-reactive solvent used according to need, whereby a hydroxyl group-containing polymer particle can be obtained.

Here, from the viewpoint of reproducibility of the quantity of a hydroxyl group to be introduced, it is preferable to make the particles even in size by classifying them in advance prior to conducting the reaction. The hydroxyl group-containing polymer particle obtained in this manner is diluted with and dispersed in a solvent such as methanol, separated by filtration, washed with water and/or a solvent and then isolated as a powder by ordinary means such as spray drying, drying under reduced pressure, and freeze drying.

A so-called ester exchange catalyst, which is used when synthesizing a polyester, is preferably utilized for the aforementioned metal-containing ester exchange reaction catalyst to be added in the invention. Examples of the above metal-containing ester exchange catalyst include transition metal compounds such as lead acetate, zinc acetate, zinc acetylacetonate, cadmium acetate, manganese acetate, manganese acetylacetonate, cobalt acetate, cobalt acetylacetonate, nickel acetate, nickel acetylacetonate, zirconium acetate, zirconium acetylacetonate, zirconium tetra-n-butoxide, titanium acetate, tetrabutoxy titanate, tetraisopropoxy titanate, titanium oxyacetylacetonate, iron acetate, iron acetylacetonate, and niobium acetate; and typical metal compounds such as dibutyltin oxide, monobutylhydroxytin oxide, dibutyltin dilaurate, antimony trioxide, germanium oxide, bismuth carbonate oxide, and bismuth acetate oxide.

Also, alkali metal compounds or alkali earth metal compounds such as magnesium acetate, lithium acetate, calcium acetate, potassium acetate, potassium carbonate, and cesium carbonate may be used. Further, rare earth metal compounds such as lanthanum acetate, samarium acetate, europium acetate, erbium acetate, and ytterbium acetate may be used.

These catalysts may be used either alone or in combination of two or more. Among these catalysts, titanium tetraalkoxide is more preferable from the viewpoint of solubility in a solvent and reactivity. Examples of the titanium tetraalkoxide include tetra-n-propoxytitanium, tetraisopropoxytitanium, tetra-n-butoxytitanium, tetraisobutoxytitanium, tetra-t-butoxytitanium, tetra-secondary-butoxytitanium, tetra-n-amyloxytitanium, and triisoamyloxyisopropoxytitanium.

The amount of the catalyst to be added to the crosslinked polymer particle is generally 0.01 to 50 parts by mass, preferably 0.1 to 20 parts by mass, and more preferably 0.5 to 10 parts by mass based on 100 parts by mass of the total particle weight. A hydroxyl group is easily introduced and the catalyst after the reaction can be removed advantageously by making the amount of the catalyst fall in the range of 0.01 to 50 parts by mass.

When the crosslinked polymer particle is crosslinked to a high degree, a non-reactive solvent capable of swelling the polymer particle may be added as an auxiliary solvent in order to promote the reaction. Examples of the solvent include aromatic compounds such as xylene, mesitylene, diethylbenzene, cyclohexylbenzene, dimethylnaphthalene, cymene and dimethoxybenzene; ether compounds such as diethylene glycol dimethyl ether, diethylene glycol dibutyl ether, diphenyl ether, dibenzyl ether, phenetole and butyl phenyl ether; ketone compounds such as acetophenone, isophorone, diisobutyl ketone, cyclohexanone and methylcyclohexanone; and halogen compounds such as dichlorobenzene, chlorotoluene and dichlorotoluene. However, any non-reactive solvent may be used as long as it attains the above object. Among these compounds, aromatic compounds such as xylene, mesitylene, and dimethoxy benzene are particularly preferable in view of reactivity.

<Method of Producing a Maleimide Group-containing Polymer Particle>

The method of producing a maleimide group-containing polymer particle in the invention is characterized in that hydroxymethylmaleimide is reacted with the hydroxyl group-containing polymer particle obtained by introducing (poly)ethylene glycol.

The above reaction between the hydroxyl group-containing polymer particle and hydroxymethylmaleimide results in the formation of a condensate obtained from the removal of one water molecule and may be conducted using a conventionally known method. In particular, this reaction is preferably conducted in the presence of an etherifying catalyst.

An acidic or a basic known etherifying catalyst is preferably used for this reaction. As a basic catalyst, a hydroxide, oxide, carbonate, bicarbonate or the like of an alkali metal or alkali earth metal may be used. These compounds may be used either alone or in combination of two or more. As an acidic catalyst, an inorganic acid such as sulfuric acid, hydrochloric acid, nitric acid or phosphoric acid or an organic acid such as p-toluenesulfonic acid, trichloroacetic acid or acetic acid may be used. These catalysts may have a hydrate form. Also, even solid catalysts of hydrotalcites may be used.

The amount of a basic catalyst or acid catalyst when it is used is 0.01 to 40% by mass and preferably 0.1 to 15% by mass as a corresponding base or acid on the basis of mass of hydroxymethylmaleimide. In the case of the solid catalyst, the amount is 0.001 to 100% by mass and preferably 0.1 to 50% by mass based on hydroxymethylmaleimide. The above catalyst and the like may be used either in the state of being dissolved uniformly in a reaction solution or in the state of not being dissolved in a reaction solution. In the uniformly dissolved state, the amount of the catalyst can be decreased. Moreover, in an undissolved state, the catalyst can be easily separated and recovered from the reaction solution using a standard method after the reaction is completed.

As regards the ratio of the aforementioned hydroxyl group-containing polymer particle to hydroxymethylmaleimide to be reacted, the amount of the hydroxymethylmaleimide is basically about 0.1 to 10 times as many as the weight of the hydroxyl group-containing polymer particle, though it depends on the combination of the ester part of the hydroxyl group-containing polymer particle and the amount of the functional groups to be introduced. Thus, a maleimide-containing polymer particle can be obtained.

Further, the reaction temperature and time in this reaction depends on the combination of the ester part of the hydroxyl group-containing polymer particle, and the amount of these functional groups, the chain length of ethylene oxide and the like and can be properly selected. The maleimide group-containing polymer particle can be usually obtained by carrying out the reaction at 80 to 180° C. under heating for 2 to 20 hours.

In the etherification reaction, any solvent may be used as as long as it does not inhibit the reaction. Examples of the solvent include toluene, xylene, and mesitylene.

It is preferable to conduct the reaction after making the particles even in size by classifying the particles in advance, from the viewpoint of the reproducibility of the quantity of a maleimide group to be introduced. The maleimide group-containing polymer particle obtained in this manner is diluted with and dispersed in a solvent such as methanol, separated by filtration, washed with water and/or washed with a solvent and can be then isolated as a powder by ordinary means such as spray drying, drying under reduced pressure, and freeze drying.

In the production method of the invention, the reaction can be conducted not only in the atmosphere but also under pressure. As regards other reaction conditions, proper conditions are selected according to the need and no particular limitation is imposed on these conditions.

The amount of the maleimide group in the maleimide group-containing crosslinked polymer particle obtained by the above operations can be found as follows. Specifically, maleimide groups present on the particle are reacted with excess 2-mercaptoethylamine and the amount of 2-mercaptoethylamine remaining after the reaction is measured, whereby the amount of the maleimide group of the particle can be found inversely.

A specific example of this method is described in, for example, the *Dojin Kagaku Kenkyujyo* General Catalogue (published on Mar. 29, 2002, First protocol series, page 80).

The production method of the invention ensures that a useful maleimide group-containing polymer particle can be obtained and this polymer particle may be preferably used in applications such as carriers for diagnostic medicines or medicaments, chromatographic carriers, viscosity regulators, resin molding materials, paint additives, crosslinking/hardening agents, and cosmetic additives.

EXAMPLES

The present invention will be explained in more detail by way of examples, which are not intended to limit the present invention. All designations of parts indicate parts by mass.

Reference Example 1

Synthesis of Crosslinked Polymer Particles 100 parts of t-butyl methacrylate (manufactured by Wako Pure Chemical Industries, Ltd.) and 5 parts of divinylbenzene (purity: 55%) are suspension-polymerized and the resultant prodcut is classified to obtain crosslinked polymer particles having an average particle diameter of 15 μm. The resulting particles are washed with deionized water and then with a solvent, isolated, and dried to obtain crosslinked polymer particles.

Reference Example 2

Synthesis of Crosslinked Polymer Particles for Comparison 70 parts of methyl methacrylate (manufactured by Tokyo Kasei Kogyo Co., Ltd.) and 5 parts of divinylbenzene (purity: 55%) are suspension-polymerized and the resultant product is classified to obtain crosslinked polymer particles having an average particle diameter of 15 μm. The resulting particles are washed with deionized water and then with a solvent, isolated, and dried to obtain crosslinked polymer particles.

Reference Example 3

Synthesis of Hydroxymethylmaleimide

24 Parts of maleimide (manufactured by Aldrich Corporation), 21 parts of 35% HCOH (manufactured by Wako Pure Chemical Industries, Ltd.) and 0.7 parts of a 5% aqueous NaOH solution are placed in a reactor and reacted at 40° C. for 2 hours. As a result, a white crystal of hydroxymethylmaleimide precipitates. This white crystal is filtered under reduced pressure and then dried at normal temperature under vacuum. The crude crystal of hydroxymethylmaleimide obtained in this manner is recrystallized from ethyl acetate to obtain 22 parts of hydroxymethylmaleimide.

Example 1

10 Parts of the crosslinked polymer particles obtained in Reference Example 1 are dispersed in 50 parts of polyethylene glycol 200 (manufactured by Wako Pure Chemical Industries, Ltd.). 15 Parts of mesitylene (manufactured by Wako Pure Chemical Industries, Ltd.) is added to the resultant dispersion and then 0.2 parts of tetra-n-propoxytitanium is added dropwise to the dispersion in a nitrogen atmosphere to react them under reflux for 14 hours. The obtained particles are dispersed in and washed with methanol and further washed with deionized water and with a solvent, isolated, and dried to obtain hydroxyl group-containing polymer particles.

17 Parts of the hydroxymethylmaleimide synthesized in Reference Example 3 and 500 parts of toluene are added to 10 parts of the hydroxyl group-containing polymer particles obtained in this manner and the mixture is stirred and heated at 60 to 70° C. Then, 0.4 parts of p-toluenesulfonic acid monohydrate as a catalyst is added to the resulting mixture and the system temperature is raised to react them under reflux for 10 hours. The obtained particles are dispersed in and washed with methanol and further washed with deionized water and with a solvent, isolated, and dried to obtain maleimide group-containing polymer particles. The amount of the maleimide group in the maleimide group-containing polymer particles obtained in this manner is measured using the following method.

<Quantitative Method of Measuring Maleimide Group in the Maleimide Group-containing Polymer Particle>

W grams of the particles are weighed and placed in a constant screw port test tube and a reaction solution of 2-mercaptoethylamine (manufactured by Tokyo Kasei Kogyo Co., Ltd.) which has been prepared in advance, is added to the particles in a fixed amount such that 2-mercaptoethylamine is added excessively. The mixture is stirred to react them.

After the particles are separated by centrifugation, 2-mercaptoamine in the supernatant is reacted with 4,4'-dithiodipyridine to find the amount B (mol) of 2-mercaptoethylamine in the supernatant by using a molar extinction coefficient $\epsilon=19800$ from the absorbance at 324 nm. The amount C (mol) of 2-mercaptoethylamine in a system containing no sample is likewise measured as a control, to find the amount A (mmol/g) of maleimide group according to the following equation.

$$A=(C-B)/W\times 1000$$

The amount of maleimide groups of these particles is 1.2 mmol/g. One part of these particles is added to 10 parts of pure water, which is then subjected to ultrasonic treatment for 30 seconds and then then the resultant is observed with a microscope in order to confirm that the particles are well dispersed.

Example 2

10 parts of the crosslinked polymer particles obtained in reference Example 1 are dispersed in 120 parts of dioxane (manufactured by Wako Pure Chemical Industries, Ltd.) and 40 parts of hydrochloric acid (manufactured by Wako Pure Chemical Industries, Ltd.) and the dispersion is reacted at 80° C. for 5 hours. The obtained particles are dispersed in and washed with deionized water, isolated, and dried to obtain carboxyl group-containing polymer particles.

10 Parts of the carboxyl group-containing polymer particles obtained in this manner is dispersed in a mixed solution of 50 g of sulfuric acid (manufactured by Wako Pure Chemical Industries, Ltd.) and 300 parts of Polyethylene Glycol 200 (manufactured by Wako Pure Chemical Industries, Ltd.) and the dispersion is reacted at 120° C. for 6 hours. The obtained particles are dispersed in and washed with deionized water, isolated, and dried to obtain hydroxyl group-containing polymer particles.

17 Parts of hydroxymethylmaleimide and 500 parts of toluene are poured into 10 parts of the hydroxyl group-containing polymer particles obtained in this manner. The mixture is stirred and heated at 60 to 70° C. and 0.4 parts of p-toluenesulfonic acid monohydrate as a catalyst is added to the mixture. The temperature of the system is raised and the mixture is reacted under reflux for 10 hours. The resulting particles are dispersed in and washed with methanol and further washed with deionized water and with a solvent, isolated, and dried to obtain maleimide group-containing polymer particles.

The amount of the maleimide groups in the maleimide group-containing polymer particles obtained in this manner is measured by the same method as in Example 1 and as a result, found to be 1.5 mmol/g. One part of these particles are added to 10 parts of pure water, and the resultant is then subjected to ultrasonic treatment for 30 seconds and then observed using a microscope. It is confirmed that the particles are well dispersed.

Comparative Example 1

The crosslinked polymer particles obtained in Reference Example 2 is subjected to the same treatment as in Example 1 to obtain comparative particles. The amount of maleimide groups in these particles is measured in the same method as in Example 1. No maleimide group is measured at all.

Comparative Example 2

The carboxyl group-containing particles obtained in Example 2 is chlorinated using thionyl chloride and then the chlorinated particles are reacted with hydroxymethylmaleimide to obtain comparative maleimide group-containing particles. The amount of the maleimide groups in the maleimide group-containing polymer particles obtained in this manner is measured by the same method as in Example 1 and as a result, found to be 0.2 mmol/g. One part of these particles added to 10 parts of pure water, and the resultant is then subjected to ultrasonic treatment for 30 seconds and then observed using a microscope. It is confirmed that the coagulation of the particles is not loosened at all, exhibiting an inferior dispersion condition.

What is claimed is:

1. A maleimide group-containing crosslinked polymer particle, the crosslinked polymer particle comprising a group represented by the following formula (1):

Formula (1)

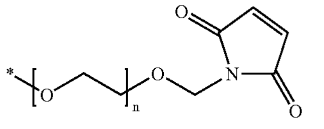

wherein in formula (1), n denotes an integer of 1 or more and * represents the crosslinked polymer particle.

2. A maleimide group-containing crosslinked polymer particle according to claim 1, wherein the component of the crosslinked polymer particle is a crosslinked polymer particle having an acrylate polymer or a methacrylate polymer.

3. A maleimide group-containing crosslinked polymer particle according to claim 1, wherein n in formula (1) is 2 or more.

4. A maleimide group-containing crosslinked polymer particle according to claim 1, wherein n in formula (1) is 4 or more.

5. A maleimide group-containing crosslinked polymer particle according to claim 1, wherein the polymer particle contains the maleimide group in an amount of 0.4 mmol/g or more.

6. A maleimide group-containing crosslinked polymer particle according to claim 1, wherein the polymer particle contains the maleimide group in an amount of 0.5 mmol/g or more.

7. A maleimide group-containing crosslinked polymer particle according to claim 1, wherein the polymer particle contains the maleimide group in an amount of 0.6 mmol/g or more.

8. A maleimide group-containing crosslinked polymer particle according to claim 2, wherein the (meth)acrylate polymer is represented by the following formula (2):

Formula (2)

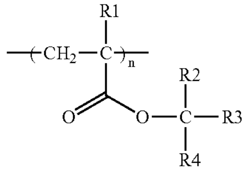

wherein in formula (2), R1 represents a hydrogen atom or a methyl group; R2 to R4, which may be the same or different, respectively represent a substituted or unsubstituted alkyl group having 1 to 12 carbon atoms or a substituted or unsubstituted aryl group; and n denotes an integer of 1 or more.

9. A maleimide group-containing crosslinked polymer particle according to claim 8, wherein the (meth)acrylate polymer represented by formula (2) is a polymer formed of at least one monomer selected from the group consisting of t-butyl acrylate, t-butyl methacrylate, 1,1-dimethylpropyl acrylate, 1,1-dimethylpropyl methacrylate, 1,1 ,2-trimethylpropyl acrylate, 1,1 ,2-trimethylpropyl methacrylate, 1,1-diethylpropyl acrylate, 1,1-diethylpropyl methacrylate, 1,1-dimethylhexyl acrylate, 1,1-dimethylhexyl methacrylate, 1-methyl-1-phenylethyl acrylate and 1-methyl-1-phenylethyl methacrylate.

10. A maleimide group-containing crosslinked polymer particle according to claim 9, wherein the crosslinked polymer particle is a copolymer of the monomer and a monomer having at least one crosslinking ability and selected from the group consisting of divinylbenzene, ethylene glycol diacrylate, ethylene glycol dimethacrylate, diethylene glycol diacrylate, diethylene glycol dimethacrylate, glycidyl acrylate, glycidyl methacrylate, 2-([1'-methylpropilideneamino]carboxyamino)ethyl acrylate and 2-([1'-methylpropilideneamino]carboxyamino)ethyl methacrylate.

11. A method of producing a maleimide group-containing crosslinked polymer particle, the method comprising reacting hydroxymethylmaleimide with a hydroxyl group-containing polymer particle into which ethylene glycol or polyethylene glycol has been introduced, wherein the crosslinked polymer particle comprises a group represented by the following formula (1):

Formula (1)

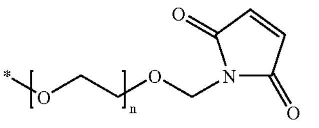

wherein in formula (1), n denotes an integer of 1 or more and * represents the crosslinked polymer particle.

12. A method of producing a maleimide group-containing crosslinked polymer particle according to claim 11, wherein the hydroxyl group-containing polymer particle is obtained by reacting a carboxyl group obtained by hydrolyzing a crosslinked polymer particle having, as its structural component, an acrylate polymer or a methacrylate polymer represented by the following formula (2) with the ethylene glycol or polyethylene glycol:

Formula (2)

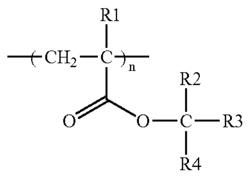

wherein in formula (2), R1 represents a hydrogen atom or a methyl group; R2 to R4, which may be the same or different, respectively represent a substituted or unsubstituted alkyl group having 1 to 12 carbon atoms or a substituted or unsubstituted aryl group; and n denotes an integer of 1 or more.

13. A method of producing a maleimide group-containing crosslinked polymer particle according to claim 12, wherein the hydroxyl group-containing polymer particle is obtained by reacting a crosslinked polymer particle containing, as its structural component, the acrylate polymer or methacrylate polymer represented by formula (2) with ethylene glycol or polyethylene glycol, in the presence of a metal-containing ester exchange reaction catalyst.

14. A method of producing a maleimide group-containing crosslinked polymer particle according to claim 13, wherein the acrylate polymer or methacrylate polymer represented by formula (2) contains at least one of a t-butyl acrylate polymer and a t-butyl methacrylate polymer and the catalyst is titanium tetraalkoxide.

15. A method of producing a maleimide group-containing crosslinked polymer particle according to-claim 12, wherein the (meth)acrylate polymer represented by formula (2) is formed of at least one monomer selected from the group consisting of t-butyl acrylate, t-butyl methacrylate, 1,1-dimethylpropyl acrylate, 1,1-dimethylpropyl methacrylate, 1,1,2-trimethylpropyl acrylate, 1,1,2-trimethylpropyl methacrylate, 1,1-diethylpropyl acrylate, 1,1-diethylpropyl methacrylate, 1,1-dimethylhexyl acrylate, 1,1-dimethylhexyl methacrylate, 1-methyl-1-phenylethyl acrylate and 1-methyl-1-phenylethyl methacrylate.

16. A method of producing a maleimide group-containing crosslinked polymer particle according to claim 15, wherein the crosslinked polymer particle is a copolymer of the monomer and a monomer having at least one crosslinking ability and selected from the group consisting of divinylbenzene, ethylene glycol diacrylate, ethylene glycol dimethacrylate, diethylene glycol diacrylate, diethylene glycol dimethacrylate, glycidyl acrylate, glycidyl methacrylate, 2-([1'-methylpropilideneamino]carboxyamino)ethyl acrylate and 2-([1'-methylpropilideneamino]carboxyamino) ethyl methacrylate.

* * * * *